UNITED STATES PATENT OFFICE.

MELCHIOR BÖNIGER, OF BASEL, SWITZERLAND, ASSIGNOR TO CHEMICAL WORKS FORMERLY SANDOZ, OF BASEL, SWITZERLAND.

ORANGE DISAZO DYE AND PROCESS OF MAKING.

959,109.   Specification of Letters Patent.   Patented May 24, 1910.

No Drawing.   Application filed August 10, 1909.   Serial No. 512,107.

*To all whom it may concern:*

Be it known that I, MELCHIOR BÖNIGER, doctor of philosophy, and residing at 116 Fabrikstrasse, Basel, Switzerland, have invented certain new and useful Improvements in the Manufacture of Substantive Orange Disazo Dyestuffs, of which the following is a specification.

This invention relates to the manufacture of new substantive orange disazo dyestuffs made by combining one molecule of the tetrazo derivative of a paradiamin of the diphenyl series with one molecule of a phenolorthocarboxylic acid and acting on the intermediate products so formed with one molecule of a 1-aryl 5-pyrazolone compound as for instance 1-sulfoaryl 3-methyl 5-pyrazolone, or 1-aryl, or 1-sulfoaryl 5-pyrazolone 3-carboxylic acids.

The new disazo dyestuffs correspond to the general formula

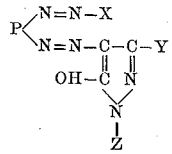

wherein P stands for the radical "diphenyl", "ditolyl", etc., X for salicylic acid, orthocresotinic acid, Y for COOH, CH$_3$ and Z for an aryl or sulfoaryl residue of the benzene series. These dyestuffs are brown-red powders in the dry state. They dissolve in water with an orange coloration, and in strong sulfuric acid with red-violet coloration and dye unmordanted cotton from a neutral or weakly alkaline salt bath bright orange shades possessing excellent fastness to sunlight, acids and alkalies.

In order to carry out my invention, I may proceed as follows:

Example I: 42.4 kilos of tolidin, dissolved in about 400 liters of water containing 102 kilos of hydrochloric acid of 20° Bé. is diazotized at 5° C. by addition of 28 kilos of sodium nitrite. The tetrazoditolyl solution thus obtained is stirred into a cooled solution of 30 kilos of salicylic acid and 30 kilos of Solvay soda in about 600 liters of water. As soon as free tetrazoditolyl can no longer be recognized, a slightly alkaline solution of 51 kilos 1 parasulfophenyl 3 methyl 5 pyrazolone is poured into the brown-yellow intermediate product, which is transformed by agitation for some hours into the disazo dyestuff possessing a red-orange color. The new dyestuff is filtered cold the next day, pressed and dried. It dyes unmordanted cotton in the shade of toluylene orange R from which it differs, however, in possessing a greatly improved fastness to light.

Example II: The tetrazo compound obtained from 37 kilos benzidin is combined at a temperature not exceeding 5° C. with the solution of 30 kilos salicylic acid and 30 kilos soda in 600 liters of water, to form the intermediate product, and into the latter, when the tetrazo diphenyl has entirely disappeared, is poured the weakly alkaline solution of 42 kilos 1-phenyl-5-pyrazolone-3-carboxylic acid. On continued stirring, the brownish-yellow intermediate product is soon converted into the bright reddish-orange disazo dyestuff, which is filtered cold, pressed and dried. The dyestuff is thus obtained in the form of a red-brown powder, soluble with a yellowish-orange coloration in boiling water and in concentrated sulfuric acid with a pure red-violet coloration. The aqueous solution is not changed on addition of caustic soda, but mineral acids precipitate the dyestuff in brownish-orange flakes.

The dyestuff dyes unmordanted cotton from a neutral or weakly alkaline salt bath—and also half-wool—in red-orange shades fast to light.

What I claim is:—

1. The process for the manufacture of substantive orange disazo dyestuffs which consists in combining one molecule of the tetrazo derivative of a paradiamin of the diphenyl series with one molecule of a phenolorthocarboxylic acid and acting on the resulting intermediate product with one molecule of a 1-aryl 5-pyrazolone compound.

2. The process for the manufacture of substantive orange disazo dyestuffs consisting in combining one molecule of the tetrazo compound of a paradiamin of the diphenyl series with one molecule of a phenolorthocarboxylic acid and in combining the resulting intermediate product with one molecule of a 1-sulfoaryl 3-methyl 5 pyrazolone.

3. The process for the manufacture of substantive orange disazo dyestuffs, consisting in combining the tetrazo compound of a paradiamin of the diphenyl series with one molecule of a phenolorthocarboxylic acid and in combining the resulting intermediate product with one molecule of a 1-sulfoaryl 5-pyrazolone 3-carboxylic acid.

4. The process for the manufacture of substantive orange disazo dyestuffs, consisting in combining the tetrazo compound of a paradiamin of the diphenyl series with one molecule of a phenolorthocarboxylic acid and in combining the resulting intermediate product with one molecule of a 1-aryl 5-pyrazolone 3-carboxylic acid.

5. As new articles of manufacture the substantive orange disazo dyestuffs which can be obtained by combining one molecule of the tetrazo derivative of a paradiamin of the diphenyl series with one molecule of a phenolorthocarboxylic acid and acting on the resulting intermediate product with one molecule of a 1-aryl 5-pyrazolone compound, these dyestuffs representing, in the form of their alkaline salts, brown-red powders soluble in water with orange coloration, and in strong sulfuric acid with red-violet coloration and dyeing unmordanted cotton in bright orange shades from a neutral or weakly alkaline salt-bath.

In witness whereof, I have hereunto signed my name in the presence of two subscribing witnesses.

MELCHIOR BÖNIGER.

Witnesses:
WERNER STAUFFACHER,
GEO. GIFFORD.